United States Patent [19]

Knisch

[11] Patent Number: 4,866,438

[45] Date of Patent: Sep. 12, 1989

[54] TRAFFIC MONITORING DEVICE

[75] Inventor: Konrad Knisch, Hilden, Fed. Rep. of Germany

[73] Assignee: Robot Foto und Electronic GmbH & Co. KG, Dusseldorf, Fed. Rep. of Germany

[21] Appl. No.: 172,022

[22] Filed: Mar. 23, 1988

[30] Foreign Application Priority Data

Apr. 11, 1987 [DE] Fed. Rep. of Germany ....... 3712314

[51] Int. Cl.$^4$ .......................... G08G 1/01; G01D 9/42
[52] U.S. Cl. .................................... 340/936; 340/937; 342/66; 342/190; 346/33 D; 346/107 VP; 364/438
[58] Field of Search .............................. 340/936, 937; 346/107 VP, 33 D; 364/438; 358/107, 110, 125; 342/66, 190

[56] References Cited

U.S. PATENT DOCUMENTS

4,053,909 10/1977 Shinoda et al. ...................... 354/105
4,500,868 2/1985 Tokitsu et al. ...................... 364/424
4,717,915 1/1988 Goede .................................. 342/66

Primary Examiner—Donnie L. Crosland
Attorney, Agent, or Firm—Lee & Smith

[57] ABSTRACT

With a traffic monitoring device for photographic recording of vehicles exceeding a predetermined speed, the speed of the approaching traffic is measured substantially against the travelling direction. The vehicles (12) are photographed frontally when they exceed the predetermined speed. Two speed measurements are effected: A first measuring value is obtained in a relatively short part of the available measuring section (22) on the entrance side and serves to release a camera (18). A second measuring value evaluates all speed measuring values occuring in the measuring section (22), in which the vehicle (12) is detected by the radar beam (20). This second measuring value is recorded.

5 Claims, 4 Drawing Sheets

TRAFFIC MONITORING DEVICE

TECHNICAL FIELD

The invention relates to a traffic monitoring device for photographic recording of vehicles exceeding a predetermined speed, wherein the speed of the vehicles is measured by Doppler radar substantially against the travelling direction and the vehicles are photographed frontally.

When here and in the following the term "photographic" is used, first of all it means in fact the generation of pictures by photochemical processes. However, the invention is also applicable, when pictures are generated in another way, for example electronically or thermally. The term "photographic" shall, particularly in the claims, also include this possibility.

BACKGROUND ART

It is known to measure the speed of vehicles by means of Doppler radar. When an emitted radar wave is reflected at a moved surface, then, due to the Doppler effect, the wavelength and thus the frequency of the reflected wave is varied relative to the wavelength and the frequency of the emitted wave. This frequency variation is proportional to the speed of the moved surface toward the radar transmitter or away from the radar transmitter. This phenomenon is used in traffic monitoring devices in order to detect exceeding of a predetermined upper speed limit. In order to obtain evidential documents for an exceeding of the predetermined upper speed limit, it is furthermore known to photograph the vehicle, when such an exceeding is detected. Particularly also the license plate of the vehicle is photographed.

With such traffic monitoring devices, a radar transmitter emits a divergent radar beam at a small angle to the longitudinal direction of the road. A measuring section is defined on the road by this divergent radar beam, a vehicle driving on the road being detected by the radar beam within this measuring section. A measuring value of the speed of the vehicle is formed from the radar signals reflected at the vehicle. A photographic camera covers an aperture angle, within which the radar beam and the measuring section are located. The camera is automatically released when said measuring value of the speed of the vehicle exceeds a predetermined threshold value. Then the display of the measuring value is reflected into the picture or recorded in some other way (CH-PS 480,697, U.S. Pat. Ser. No. 3,522,611). It is also known to arrange a row or a matrix of luminous diodes in the area of the film rim, these diodes being controlled during the film feeding by a memory memorizing the measuring value of the speed, such that the measuring value is digitally recorded on the film rim (U.S. Pat. Ser. No. 4,053,909, DE-Pat. Ser No. 3,034,161).

The aperture angle of the camera must not be too large. The camera shall namely particularly record the license plate of the vehicle such that it can be clearly identified. Thus, an objective of long focal length having a correspondingly narrow field of view has to be used. This results in some problems:

Generally the photographed vehicle is not alone on the road. Other vehicles are present, which generally move at different speeds. Passing actions take place. These other vehicles can considerably disturb the radar measurement. They can possibly feign an exceeding of the upper speed limit, which is not present in reality or in any case not done by the driver of the photographed vehicle. The evidential value of radar measurement and photographic picture can thereby be reduced very much. This is particularly the case when the radar measurement just makes an "instant picture" and thus measures the speed just within a relative short period of time.

In order to at least recognize these errors, it would be necessary to photograph a larger field of view. Then it could be recognized, whether there were other, for example passing vehicles in the area of the photographed vehicle presumed to be measured, which other vehicles could have falsified the measurement. This requirement of recording a larger field of view stands in contradiction to the requirement of a clear picture of the license plate of the vehicle. The simultaneous recording by two cameras, one of which operates with an objective of short focal length and the other one of which operates with an objective of long focal length, requires considerable technical expenditure and doubles the film consumption.

Another way of recognizing erroneous measurements effected by other vehicles consists in that the speed measured by Doppler radar is followed up over a period of time as long as possible. The measurement should thus, if possible, be effected throughout the total measuring section, that is as long as the vehicle is hit by the radar beam. From the signal waveform over a time as long as possible, possible disturbing influences can then be recognized more easily.

Practically each Doppler period supplies a measuring value of the speed of the detected vehicle. Thus, series of individual measuring values are obtained. These measuring values can vary considerably due to different influences. A method is known for forming a measuring value to be recorded from these different varying measuring values and for elimination of doubtful measuring values. In this method the measuring values are classified according to speed classes. Thus, it is examined, how often a measuring value lies, for example, between 40 km/h and 50 km/h, how often between 50 km/h and 60 km/h etc. This results in a "histogram", that means a representation of the number of the speed measurements as a function of the measuring result. That part of the histogram is examined, which is located above a certain frequency level. With an accurate measurement one measuring value should dominate, that means that many measurements should result in this measuring value. The variation should be small. In this case the histogram would be a high narrow peak. Very wide histograms or histograms having several peaks and gaps therebetween indicate disturbances. In the first case the value of the speed, at which the high narrow peak is located, is taken as measuring value to be indicated. In the latter cases the measurement is rejected. In the known method the measurement is carried out over the total measuring section.

In the known method the traffic moving away is measured. This does not present any problems, after the measurement has been effected and evaluated, to make the photographic picture, when the vehicle with its rear leaves the radar beam, if the measurement indicates unambiguously exceeding of the upper speed limit. Then the rear of the vehicle is located at the limit of the radar beam and the measuring section, this limit being located within the field of view.

However, it is often desirable to monitor the approaching traffic, that means the vehicles travelling towards the radar beam in the direction toward the traffic monitoring device. This necessity can result from practical conditions. The monitoring of the approaching traffic also offers the advantage, that the vehicle can be photographed frontally. Thereby, using suitable exposure techniques, not just the license plate of the vehicle can be identified but also the driver.

If, however, it is desired to monitor the approaching traffic in the described way, then problems arise with the photographic recording: When the vehicle has completely passed the measuring section, such that its rear is located at the limit of the measuring section this time located on the side of the traffic monitoring device, then, due to the narrow field of view of the camera, the front end of the vehicle with the license plate of the vehicle generally is already located outside the field of view. Thus, the license plate of the vehicle could not be detected any more.

Therefore it is known, in the measurement in approaching traffic, to effect the measurement of the measuring value of the speed just in a narrow part of the measuring section actually available and to release the camera due to this measurement, when the measuring value exceeds the predetermined threshold value. Then the measuring value obtained with this measurement also is recorded. This results in the disadvantage already mentioned above, that practically just an instant value of the speed measured with the Doppler radar is obtained, which does not permit any conclusions about disturbing influences and the reliability of which can therefore be doubtful.

Therefore, a method for photographic traffic monitoring is known (EP-A- 0,188,694), wherein the releasing of the camera in fact is controlled by such a relative short-time speed measurement, such that the front end of the vehicle still is detected in the field of view of the camera, and with which also the measuring value obtained with this short-time speed measurement is recorded, wherein, however, subsequently a "verification" of this measuring value is effected. Over the rest of the measuring section it is examined whether the arriving speed measuring values are within a predetermined band width about the first measuring value to be recorded. If this is not the case, this measuring value is not recorded, that means it is not reflected into the picture already made.

Also with this known method the measuring value of the speed to be recorded is obtained just on a part of the available measuring section. Therefore the measuring value is not completely reliable, as explained above. However, the "verification" during the remaining part of the measuring section uses this not quite reliable measuring value as a reference.

DISCLOSURE OF INVENTION

It is object of the invention to provide a traffic monitoring device such that, when monitoring the approaching traffic, on one hand the total available measuring section is used for forming the measuring value to be recorded and, on the other hand, reliable detection of the front license plate of the vehicle by the photographic picture is ensured.

According to the invention this object is achieved by the steps indicated in the claims.

Thus, according to the invention, two measurements are effected: A first "coarse measurement" just controls the camera. If it is suspected, that the vehicle exceeds the predetermined upper speed limit, it is still photographed at a place, at which the front license plate of the vehicle is clearly visible for the camera. However, contrary to the known methods and also to EP-OS No. 0,188,694, this measuring value is not recorded as speed of the vehicle. The measuring value of the speed of the vehicle finally recorded is obtained from measurements over the total measuring section. Possible disturbance influences can be detected from these measurements. Thus, this measuring value has a higher degree of reliability than a measuring value obtained only on part of the measuring section. No measuring value of relatively low reliability is used as reference for a "verification", as it is the case in EP-OS No. 0,188,694. Only when the second measuring value unambiguously indicates exceeding of the upper speed limit, this measuring value is recorded as speed of the vehicle. Otherwise, it can be indicated, that the upper speed limit was not exceeded or that the measuring value is doubtful.

The invention permits the application of the known method described above, with which a histogram is formed and evaluated from the measuring values obtained over the measuring section. When, as known for example from DE-PS No. 3,034,161, the recording of the measuring value of the speed is effected at the film rim during the film feeding, the recording is anyway delayed with respect to the recording of the vehicle. Then it presents no problems to make this recording and the evaluation of the measurement dependent on the result of the measurement of the speed effected over the total measuring section.

An embodiment of the invention will now be described in greater detail with reference to the accompanying drawings.

BEST MODE OF CARRYING OUT THE INVENTION

Figure 1:
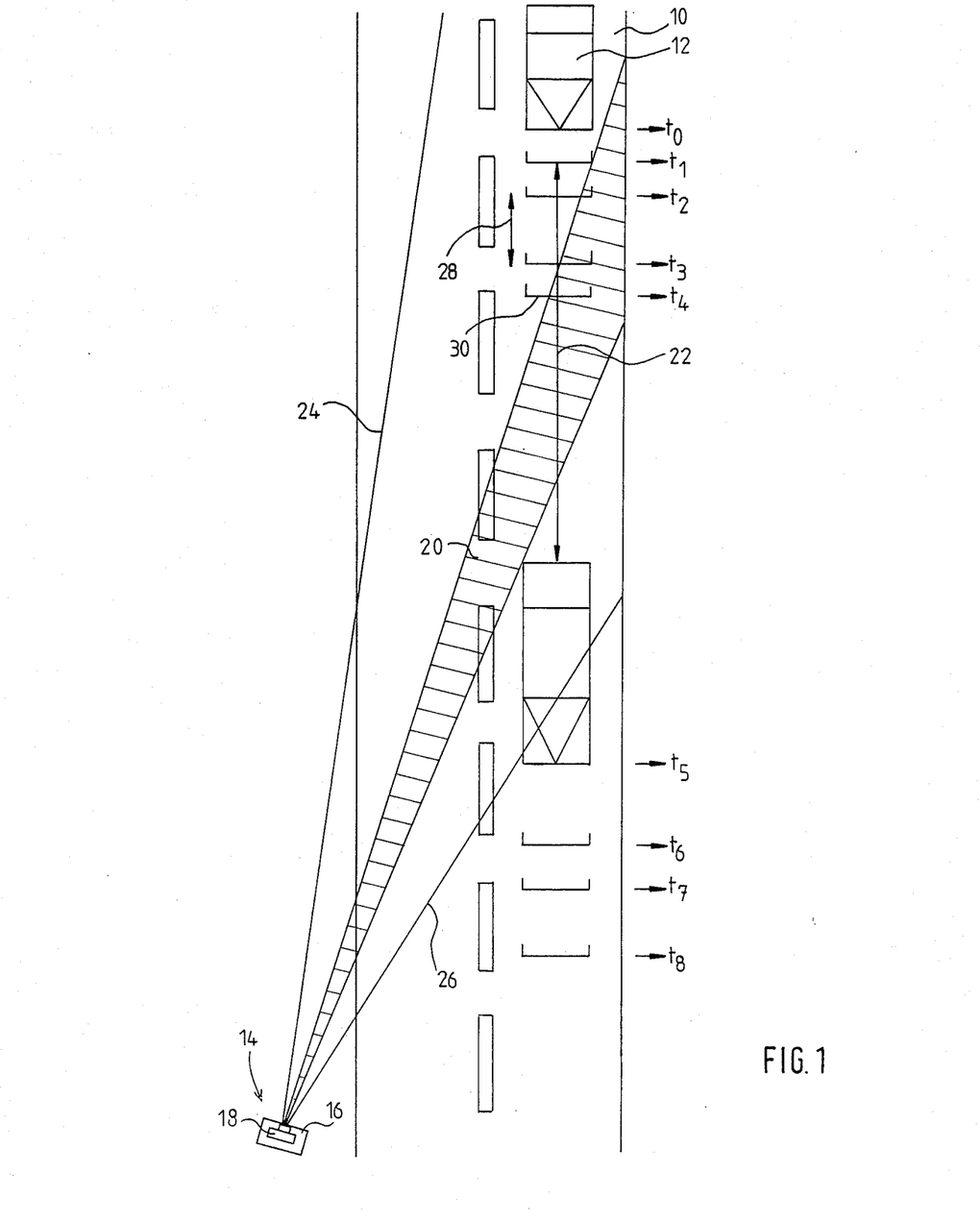
FIG. 1 is a schematic illustration and illustrates the movement of a vehicle through the radar beam and the field of view of the camera.

In FIG. 1 numeral 10 designates a road. A vehicle 12 is driven on this road in the direction from the top to the bottom in FIG. 1. The speed of the vehicle is monitored by means of a traffic monitoring device 14 operating with a Doppler radar. The traffic monitoring device comprises a radar device 16 and a photographic camera 18. The radar device 16 generates a divergent radar beam 20. The radar beam 20 extends at a small angle to the longitudinal direction of the road. Thereby a measuring section 22 is defined on the road, in which measuring section a vehicle is detected by the radar beam. The camera 18 has an aperture angle limited by the limiting rays 24 and 26. This aperture angle covers the radar beam 20 and the measuring section 22. The camera 18 is provided with an objective of relatively long focal length, such that the license plate of the vehicle is clearly identified in a picture of the vehicle 12.

The traffic monitoring device receives the radar signals reflected at the vehicle 12 and forms therefrom speed measuring values, which shall represent the speed of the vehicle 12. Therein, the Dopler effect is made use of, that is the fact, that the frequency of the radar radiation reflected by a moved vehicle 12 is varied with respect to the emitted radiation, and this by an amount proportional to the speed of the vehicle.

Practically each Doppler period supplies a speed measurement, when the duration of the period is measured. The function of a radar device for measuring the speed of vehicles is well known and thus is not described here in detail.

If the measurement of the speed by means of a radar device results in a measuring value above an upper speed limit, the camera 18 is automatically released.

With the traffic monitoring device illustrated in FIG. 1 the approaching traffic is monitored. The vehicle 12 moves towards the traffic monitoring device 14, opposite to the direction of the emitted radar beam 20. Thus, two measurement of the speed are effected, each of these measurements again being derived from a plurality of individual speed measurements. A first measurement is effected in a section 28 of the measuring section 22 on the entrance side. A second measurement is effected in the totally available measuring section 22 from the time $t_1$ on, at which the vehicle 12 enters the radar beam 20, to the time $t_5$, at which the vehicle 12 leaves the radar beam. In FIG. 1 the vehicle 12 is shown once in a position just before it enters the radar beam (time $t_0$) and another time in a position, in which it leaves the radar beam 20. Other positions of the vehicle 12 are just indicated.

At the time $t_2$ the measurement starts. The beginning of the measurement is determined by the condition, that before, during three consecutive Doppler periods of the reflected radar radiation, the speed measuring values resulting from the duration of the period do not differ by more than 1 km/h. The first measuring value of the speed is formed between the time $t_2$ and the time $t_3$. The period of time between the time $t_2$ and the time $t_3$ forms said part 28 of the measuring section 22 on the entrance side. Between the time $t_1$, that is practically the time $t_2$, and the time $t_5$, that is during the total measuring period, furthermore a second measuring value of the speed is formed. This is described in detail hereinbelow with reference to FIGS. 4 and 6.

When the first measuring value at the time $t_3$ is above a predetermined threshold value, which for example is equal to the upper speed limit, then the camera 18 is released, i.e. triggered or actuated at the time $t_4$. In the position 30 a picture of the vehicle 12 is taken. Then the vehicle is located with its front end and the front license plate of the vehicle in the center of the aperture angle of the objective. Therefore the license number of the vehicle is clearly identified in the picture. When using suitable illumination and recording techniques, it is also possible to record the driver of the vehicle through the windscreen such that the driver can be identified.

At the time $t_5$, when the vehicle is leaving the radar beam 20, the front license plate of the vehicle would not be detected any more by the camera 18. Increasing the aperture angle between the limiting rays 24 and 26 would demand an objective of short focal length and thus reduce the recognizability of the license number of the vehicle.

The time $t_6$ marks the end of the measurement. The end of the measurement is defined in that no reflected radar beams are received during a predetermined dead time. At the time $t_7$ the evaluation of the measuring data is finished. The camera motor is started in order to feed the film. The second measuring value is recorded or not on the film rim during the film feeding in dependence on this second measuring value determined over the total measuring period 22. This is effected by the device described in DE-PS No. 3,034,161. If the measuring value is below the threshold value or has turned out to be not reliable, this can also be marked on the film by the same device. The described recording is finished at the time $t_8$.

Figure 2:
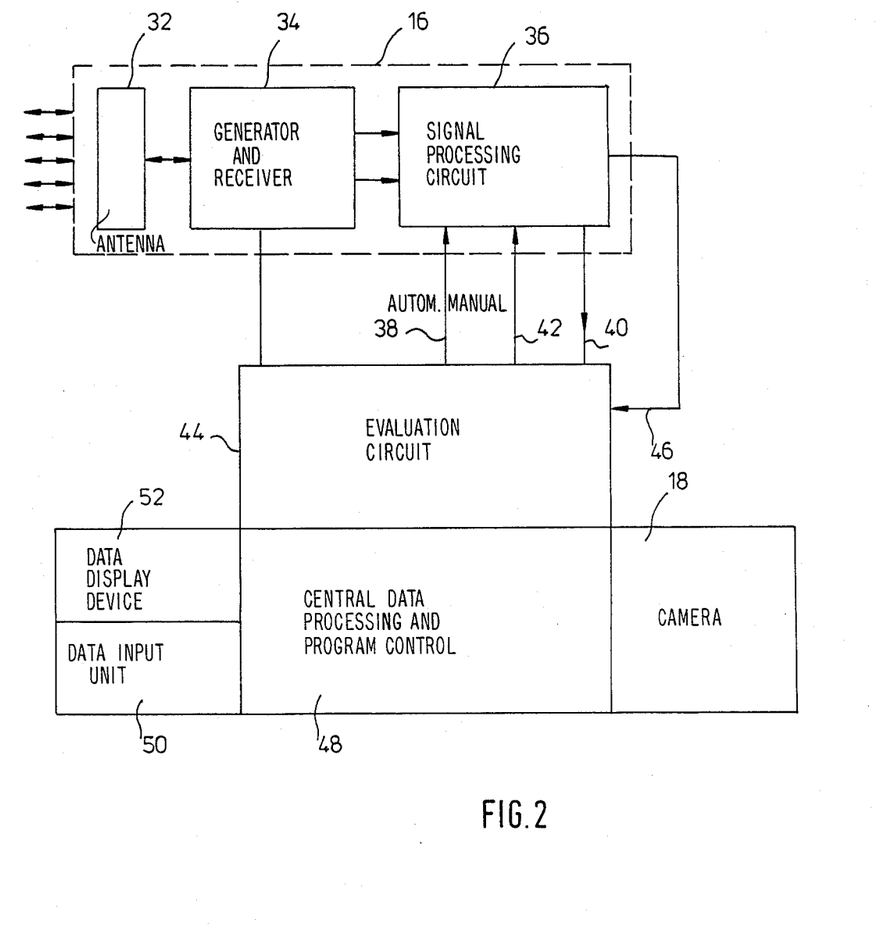
FIG. 2 is a block diagram and illustrates the signal processing in a traffic monitoring device.

FIG. 2 is a block diagram of the traffic monitoring device 14. The traffic monitoring device 14 comprises a radar device 16. The radar device 16 is provided with an antenna 32. The antenna emits the radar beam 20 and simultaneously receives the radar radiation reflected at the vehicle 12. The antenna is connected to a generator and receiver unit 34. The generator and receiver unit 34 generates the signals applied to the antenna 32 for the emitted beam and processes at the same time the received signals. The signal thus obtained are digitized in a signal processing circuit 36. The direction of movement of the detected vehicle can be determined by the signal processing circuit from the sign of the deviation of the frequency of the reflected radar radiation from the frequency of the emitted radar radiation. As indicated by the input 38, the signal processing circuit 36 can optionally be switched to "automatic" or "manual". In the first case the signal processing circuit itself determines the direction of movement of the observed vehicle. In the second case a certain direction of movement can be determined, and then only vehicles of this direction of movement are taken into consideration. In the first case the determined direction of movement is output through an output 40. In the latter case the desired direction of movement is input through an input 42.

An evaluation circuit 44 receives through an input 46 the digitized speed measuring values formed from the Doppler signals. The evaluation circuit 44 furthermore receives direction of movement signals from the output 40 of the signal processing circuit 36. In a way still to be described, the first and the second measuring values of the speed of the vehicle are formed in the evaluation circuit. Furthermore, criteria for the reliability of the second measuring value are obtained by a statistical analysis of the appearing speed measuring values, which correspond to a Doppler period of the radar waves each.

The signals from the evaluation circuit 44 are supplied to a central data processing and program control 48. The data processing and program control 48 controls the camera 18 and the recording of the second measuring value in the described way. Numeral 50 designates a data input unit. Furthermore, a data display device 52 is provided.

The function of such a traffic monitoring device is known in principle. Therefore the individual components are not described here in detail.

Figure 3:
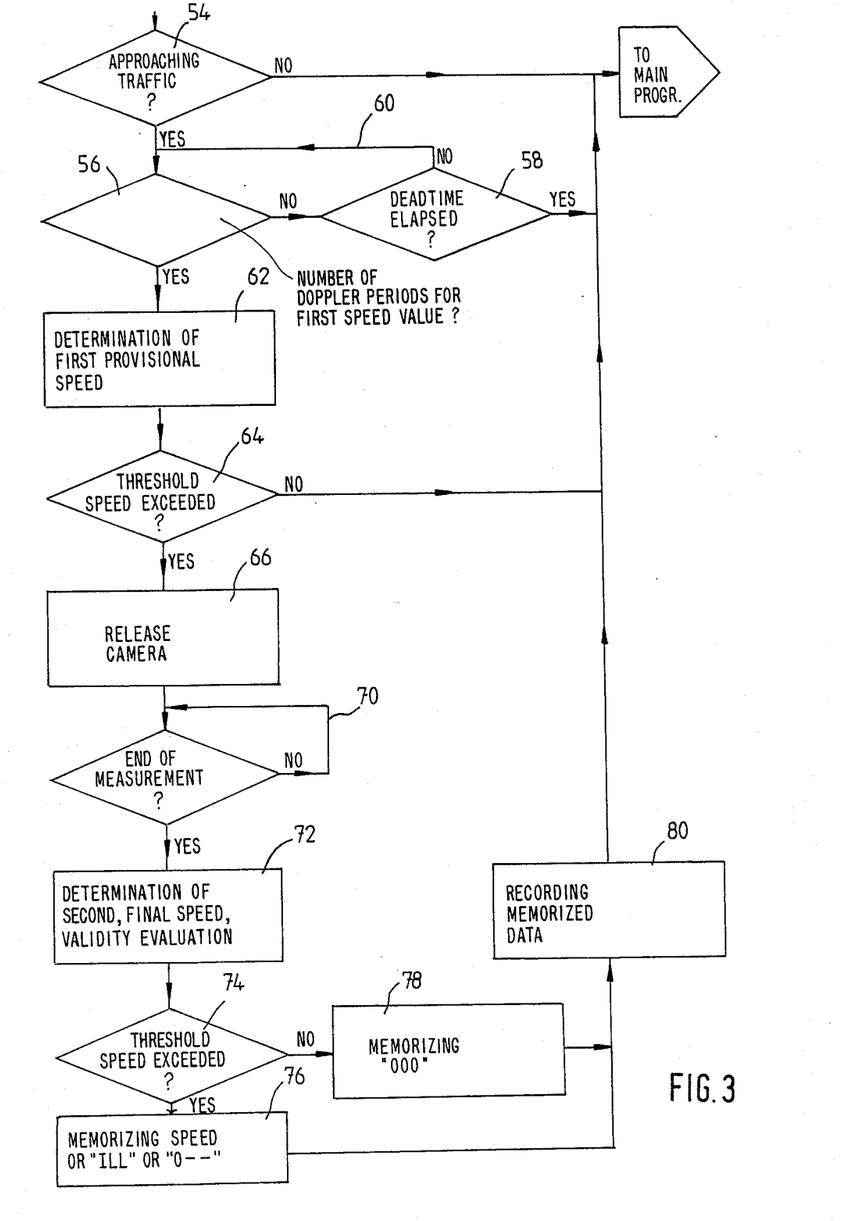
FIG. 3 is a flow chart and illustrates the course of operation.

FIG. 3 is a flow chart and illustrates the function of the traffic monitoring device during measurement of the speed in approaching traffic.

According to the diamond 54 at first a examination is effected, whether a measurement takes place in approaching traffic. This results either from the state of the input 42 when the input 38 is switched to "manual" or from the output 40 of the signal processing circuit 36 when the input 38 is switched to "automatic". If the result of the examination is negative ("no"), the traffic monitoring device turns over to the "main program" not of interest here. If the result of the examination is positive ("yes"), an examination according to the diamond 56 is effected, whether the number of Doppler periods provided for the first measuring value of the speed has already been received. If this is not the case ("no"), a further examination symbolized by the diamond 58 is effected, whether a predetermined dead time already has elapsed, during which no Doppler periods have been received. The dead time examined according to the diamond 58 ensures, that the Doppler periods are not absent for too long a time, that means that the measurement consists of a sequence without essential interruptions. When the dead time has elapsed ("yes"), this means the stop of the measurement. The traffic monitoring device returns to the main program. If the dead time has not yet elapsed ("no"), the program passes through a loop 60 and repeats the examination according to the diamond 56. The loop 60 is passed through until the number of Doppler periods required for the determination of the first measuring value are received and thus a corresponding number of speed measuring values is available. This is the time $t_3$ in FIG. 1. By the evaluation circuit said first measuring value of the speed is formed from these instantaneous speed measuring values. This is illustrated by a block 62 in the flow chart.

Then a new examination is effected, whether a predetermined threshold value of the speed has been exceeded or not. This is illustrated by a diamond 64. If the result of the examination is negative ("no"), the traffic monitoring device returns again to the main program. If the result of the examination is positive, that means that when the predetermined threshold value has been exceeded ("yes"), the camera 18 is released, i.e. triggered or actuated. This is illustrated by a block 66 in the flow chart. The recording is anew followed by an examination, whether the measurement is finished or not. This is illustrated by a diamond 68. The criterion herefor is again the absence of Doppler periods for a predetermined dead time. This is the above mentioned dead time between the times $t_5$ and $t_6$ of FIG. 1. If the result of the examination is negative ("no"), a loop 70 is passed through and the examination is repeated. This takes place until the result of the examination is positive, that means that no Doppler periods are received during the predetermined dead time ("yes"). In this latter case the final evaluation of the speed signals is started to form said second measuring value of the speed of the vehicle 12. This evaluation is effected by the evaluation circuit 44 of FIG. 2 in the way still to be described with reference to FIGS. 4 to 6. The evaluation also includes an examination of the usability of the obtained second measuring value of the speed on the basis of the histogram evaluation described below. The formation of the second measuring value of the speed and the evaluation of the instantaneous speed measuring values for examination of the usability of this measuring value is illustrated by a block 72 in the flow chart of FIG. 3.

The formation of the second definite measuring value of the speed is anew followed by an examination, whether the measuring value exceeds a predetermined threshold value or not. This examination is illustrated by a diamond 74 in the flow chart. If the result of the examination is positive ("yes"), that means when the predetermined threshold value has been exceeded, for the recording on the film either the determined second measuring value of the speed is prepared when the measurement has been judged to be usable in the evaluation according to block 72, or the indication ILL (=illegal) is provided when the evaluation resulted in doubts about the usability of the measuring value. This preparation and storage of the measuring value and of the indication ILL, respectively, is illustrated by a block 76. If the result of the examination is negative, that means if the final evaluation results in that actually there was no exceeding of the threshold value, the indication "000" is prepared for the recording. This is illustrated by a block 78 in the flow chart. When then at the time $t_7$ the film feeding starts, the prepared data are called in according to the method of DE-PS No. 3,034,161 and registered at the film rim during the film feeding. This is illustrated by a block 80 in the flow chart. Subsequently the traffic monitoring device returns again to the main program.

Figure 4:
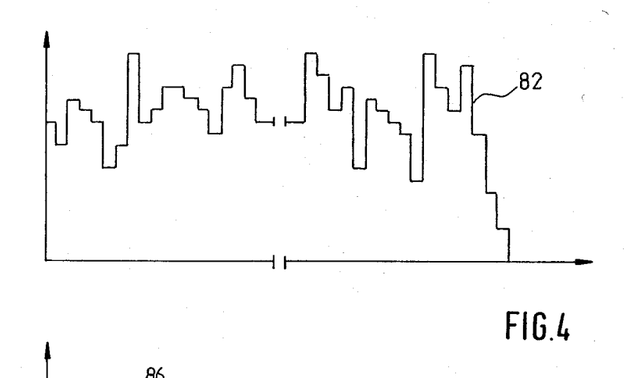
FIG. 4. shows a typical waveform of the speed measuring values obtained by the Doppler radar.
Figure 5:
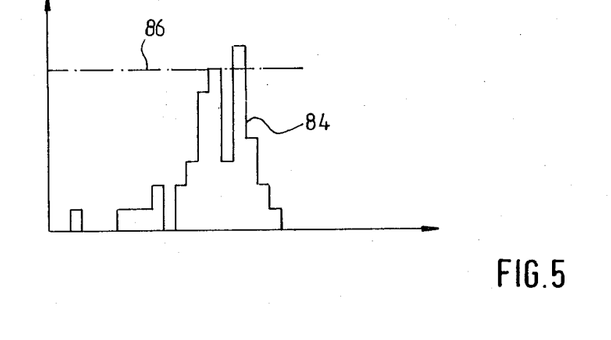
FIG. 5 shows a histogram obtained from the speed measuring values of FIG. 4.
Figure 6:
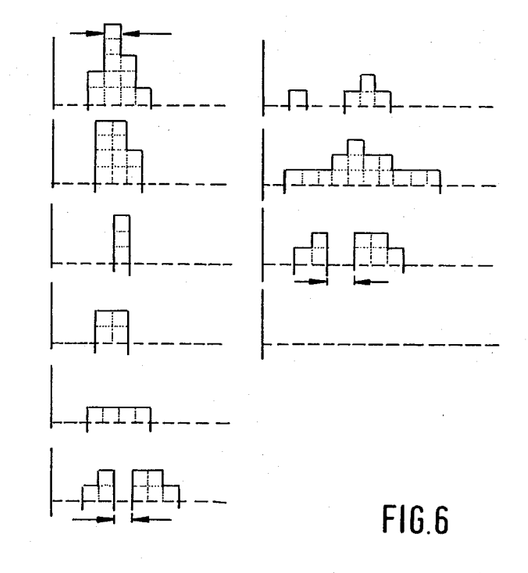
FIG. 6 illustrates the evaluation of the histograms obtained with the speed measurements over the measuring section for distinction between evaluateable and non-evaluateable measurements and for obtaining the "second" measuring value of the speed of the vehicle.

In FIGS. 4 to 6 the evaluation of the speed signals for determination of the second measuring value and for obtaining criteria for the usability of this measuring value is schematically illustrated in an example. As already mentioned above, this manner of forming the measuring value and the evaluation is know per se. It is, however, applicable with the described traffic monitoring device also for the monitoring of the approaching traffic.

Numeral 82 in FIG. 4 designates a signal waveform as it results from the consecutive instantaneous speed measuring values corresponding to a Doppler period each. Thus, the signal waveform shows the measured speed as a function of time.

According to FIG. 5 a "histogram" 84 is formed from these speed measuring values. The speed measuring values are classified into speed classes. Speeds are plotted as abscissa. Frequencies occur as ordinate. Thus, it is, for example, plotted, with reference to the speed measuring values according to FIG. 4, how often a value between 40 km/h and 41 km/h or between 41 km/h and 42 km/h has occurred etc. Now a frequency level $n_G$ is established. This frequency level defines a limit line 86. The parts of the histogram are examined, which are located above this limit line 86. From this the second measuring value of the speed is obtained as well as a criterion for the reliability of the measuring value. This will now be described with reference to FIG. 6.

In the left column of FIG. 6 all cases are shown, in which the speed measuring values formed from the radar signals supply the formation of a usable measuring value of the speed of the vehicle 12. Above the limit line 86, either only one peak occurs or two closely adjacent peaks are obtained. The breadth of the peaks does not exceed a determined amount. This means, that the measuring value is based on many individual speed measuring values, which all are relatively close to each other. Thus, this measuring value is reliable. There are no measuring values very different therefrom. Contrary thereto, in the right column cases are shown, which do not allow any reliable formation of a measuring value. Several peaks are present, which indicate a second vehicle travelling with different speed, or the peak is very wide. The latter means, that the speed measuring values are widely spread. In the case illustrated in the third line of the right column a wide gap can be seen, which also indicates vehicles with different speeds. The last line of the right column does not show any peaks at all extending over the limit line. In all of these cases the recording of the speed during the film feeding is prevented and, instead, the indication ILL is output.

The total number of the speed measuring values obtained from the beginning to the end of the measurement, that means practically the integral of the histogram with respect to the speed or the frequency sum, supplies a criterion of the size of the vehicle. Thereby it is possible to differentiate between a passenger car and a motor lorry. The limit line 86 is correspondingly changed: For a motor lorry, which supplies more speed measuring values than a passenger car during the measuring time, the limit line 86 has to be raised with respect to that one valid for a passenger car.

When, due to the histogram, it is possible to distinguish between a passenger car and a motor lorry, then also different threshold values for the measuring values of the speed can be determined for these two types of vehicles, when a lower value of the upper speed value is valid for motor lorries than for passenger cars. The evaluation of the speed measuring values according to block 72 of FIG. 3 can include an integration of the histogram with respect to speed, in order to obtain a criterion for the vehicle type (passenger car or motor lorry). Then, accordingly, the examination according to diamond 74 of FIG. 3 can be based on a higher threshold value predetermined for passenger cars or a lower threshold value predetermined for motor lorries, depending on which vehicle type is indicated by the evaluation according to block 72.

It might be that the frequency sum exceeds a second upper limit, which is above the frequency sums, which can be caused even by very long motor lorries. This is the case, when a convoy of vehicles at small distances travels through the radar beam. Then the radar beam always detects at least two vehicles, such that practically no pause occurs between the Doppler signals. Also in this case an indication of the measuring value of the speed is prevented in the evaluation according to block 72. A mark, for example "0—", can be provided to characterize such convoy situations.

I claim:

1. Traffic monitoring device for photographic recording of vehicles exceeding a predetermined speed, wherein the speed of the vehicles is measured by Doppler radar substantially against the travelling direction and the vehicles are photographed frontally, comprising
   (a) a radar transmitter (16), which emits a divergent radar beam (20) at a small angle to the longitudinal direction of the road, such that a measuring section (22), in which a vehicle (12) is detected by the radar beam (20), is defined on the road (10),
   (b) a camera (18) having an aperture angle covering the measuring section (22) and adapted to produced a picture of a vehicle (12) in a way permitting identification of the license number of the vehicle,
   (c) means for forming a measuring value of the speed of a vehicle from the radar signals reflected at the vehicle in a part (28) of the measuring section (22) where the vehicle is initially entering the measuring section (22),
   (d) means for actuating the camera when said measuring value exceeds a predetermined threshold value, and
   (e) speed recording means, characterized in that
   (f) means are provided for forming a second measuring value of the speed of the vehicle (12) from a plurality of speed measuring values, which are obtained over the total measuring section (22) from the radar signals reflected at the vehicle (12), and
   (g) the second measuring value of the speed is applied to the speed recording means.

2. Device as set forth in claim 1, characterized in that
   (a) the camera (18) is a photographic camera having a film feedable picture by picture,
   (b) the speed recording means comprise an arrangement of light emitting diodes, which are arranged in the area of the film rim and adapted to be controlled during the film feeding by memory means memorizing said second measuring value such that said second measuring value is digitally recorded on the film rim, and
   (c) the speed recording means are adapted to be energized for recording of a speed only when said second measuring value exceeds a predetermined threshold value.

3. Device as set forth in claim 1, characterized in that
   (a) means are provided for forming a histogram (84) from said plurality of speed measuring values, as well as
   (b) means for establishing a frequency level (86), and
   (c) means for analyzing the structure of the part of the histogram (84) exceeding the predetermined frequency level (86) for the purpose of distinction between evaluateable and non-evaluateable measurements.

4. Traffic monitoring device for photographic recording of vehicles exceeding a predetermined speed, wherein the speed of the vehicles is measured by Doppler radar substantially against the travelling direction and the vehicles are photographed frontally, comprising
   (a) a radar transmitter (16), which emits a divergent radar beam (20) at a small angle to the longitudinal direction of the road, such that a measuring section (22), in which a vehicle (12) is detected by the radar beam (20), is defined on the road (10),
   (b) a camera (18) having an aperture angle covering the measuring section (22) and adapted to produce a picture of a vehicle (12) in a way permitting identification of the license number of the vehicle,
   (c) means for forming a measuring value of the speed of a vehicle from the radar signals reflected at the vehicle in a part (28) of the measuring section (22) where the vehicle is initially entering the measurement section (22),
   (d) means for actuating the camera when said measuring value exceeds a predetermined threshold value, and
   (e) speed recording means, characterized in that
   (f) means are provided for forming a second measuring value of the speed of the vehicle (12) from a plurality of speed measuring values, which are obtained over the total measuring section (22) from the radar signals reflected at the vehicle (12), and
   (g) the second measuring value of the speed is applied to the speed recording means, (h) means are provided for forming a histogram (84) from said plurality of speed measuring values, as well as
(i) means for establishing a frequency level (86),
(j) means for analyzing the structure of the part of the histogram (84) exceeding the predetermined frequency level (86) for the purposes of distinction between evaluateable and non-evaluateable measurements,
(k) means for adding up all frequencies of the histogram (84) to form a frequency sum are provided,
(l) a limit value for the frequency sum is predetermined, frequency sums below the limit value being associated with a first type of vehicle (passenger cars) and frequency sums above the limit value being associated with a second type of vehicles (motor lorries), and
(m) a first threshold value for the measuring values of the speed is predetermined with a frequency sum below the limit value and a second threshold value for the measuring values of the speed is predetermined with a frequency sum above the limit value.

5. Device as set forth in claim 4, characterized in that a second upper limit value for the frequency sum is predetermined, frequency sums above this upper limit value being associated with a vehicle convoy and a thus obtained measuring value of the speed being not accepted.

* * * * *